United States Patent [19]

Sugiura et al.

[11] Patent Number: 4,933,214

[45] Date of Patent: Jun. 12, 1990

[54] FINISH COATING METHOD

[75] Inventors: Shinji Sugiura, Fujisawa; Teiitsu Takagi, Hiratsuka; Yuzo Miyamoto, Yokohama; Akira Kasari; Sachio Yamaguchi, both of Hiratsuka, all of Japan

[73] Assignee: Kansai Paint Company, Limited, Amagasaki, Japan

[21] Appl. No.: 272,970

[22] Filed: Nov. 18, 1988

[30] Foreign Application Priority Data

Nov. 26, 1987 [JP] Japan ................................. 62-299331

[51] Int. Cl.$^5$ .............................................. B05D 3/02
[52] U.S. Cl. .................................. 427/379; 427/388.3; 427/409
[58] Field of Search .................. 427/388.2, 407.1, 379, 427/388.3, 409

[56] References Cited

U.S. PATENT DOCUMENTS

| 4,463,038 | 7/1984 | Takeuchi et al. | 427/409 X |
| 4,490,417 | 12/1984 | Shindow et al. | 427/409 X |
| 4,634,738 | 1/1987 | Santer | 427/409 X |

*Primary Examiner*—Michael Lusignan
*Attorney, Agent, or Firm*—Armstrong, Nikaido, Marmelstein, Kubovcik & Murray

[57] ABSTRACT

A coating method characterized in that the method comprises the steps of applying a thermosetting coating composition containing a pigment to a substrate to be coated, applying a first clear coating composition to the coat to form a first clear coat, baking the two coats at the same time for curing, applying to the cured coats a second clear coating composition capable of forming a second clear coat having, when cured, a molecular weight between crosslinks of about 200 or less as determined by a xylene-swelling method and baking the second clear coat for curing.

5 Claims, No Drawings

FINISH COATING METHOD

This invention relates to a novel finish coating method and more particularly to a finish coating method which gives coats having a good finish appearance and a high scratch resistance.

In recent years, coating methods extensively used for automotive bodies include those using a clear top coating composition containing no pigment to improve a coating film appearance. In view of productivity, this method is usually carried out by applying a base coating composition containing a pigment, then applying a clear coating composition to the base coat and baking the two coats at the same time for curing. This technique is generally called "2-coat 1-bake system" (hereinafter referred to as "2C1B") in the art. While a finish coating method of 2C1B can produce a coat superior in finish appearance to a one-layer finish coat formed from a pigment-containing coating composition, the current market demands a further improved finish appearance.

On the other hand, the clear topcoat formed on automotive body panels by the 2C1B finish coating method is readily scratched, for example, by collision with sand or dust particles during driving or by friction against car washer brushes. The resulting scratches are partially responsible for impaired finish coat appearance on automotive bodies and are likely to stand out particularly on automotive bodies finished with coats of deep colors such as black, dark blue or red. With this problem, there is a strong demand for clear topcoats having an improved scratch resistance.

It is an object of the present invention to provide a coating method which gives coats having a finish appearance and a scratch resistance both pronouncedly improved without reduction of weatherability, chemical resistance, water resistance, mechanical characteristics and the like.

Other objects and features of the invention will become more apparent from the following description.

This invention provides a coating method characterized in that the method comprises the steps of applying a thermosetting coating composition containing a pigment to a substrate to be coated, applying a first clear coating composition to the coat to form a first clear coat, baking the two coats at the same time for curing, applying to the cured coats a clear coating composition capable of forming a second clear coat having, when cured, a molecular weight between crosslinks of about 200 or less as determined by a xylene-swelling method and baking the second clear coat for curing.

Our research shows the following findings. The clear coat formed by the conventional 2C1B finish coating method usually has a molecular weight between crosslinks of about 250 or more as determined by a xylene-swelling method. On the other hand, the clear coat having a molecular weight between crosslinks of about 200 or less, namely a high crosslink density, exhibits a significantly improved scratch resistance. Another finding is that when the clear coat of 200 or less in molecular weight between crosslinks is formed as a second clear coat on the clear coat (first clear coat) produced by the 2C1B method, the finish appearance can be markedly improved and in this way, the object of the invention is accomplished.

It is critical in the present invention that the second clear coat formed from the second clear coating composition have a molecular weight between crosslinks of about 200 or less after curing. With this feature, the finish coating method of the invention can produce a scratch-resistant finish coat with an outstanding appearance. The molecular weight between crosslinks of cured second clear coat is preferably about 180 to about 50, more preferably about 110 to about 50.

The molecular weights between crosslinks in the present invention are those determined by a xylene-swelling method to be described below.

METHOD OF DETERMINING THE MOLECULAR WEIGHT BETWEEN CROSSLINKS (1) A clear coating composition is applied by spray coating method using a tinplate as a substrate to be coated and thermally cured.

(2) The clear coat is peeled off from the tinplate by the mercury-amalgam process to separate a film measuring about 4 cm X about 4 cm.

(3) Xylene is poured into a desiccator, and then the film is placed on the liquid surface and gradually swollen by xylene vapor.

(4) The film is immersed in the xylene at 25° C. for 24 hours to reach a swelling equilibrium.

(5) The film is withdrawn from the xylene and interposed between filter paper sheets, and the xylene on the surface of the film is quickly removed.

(6) The film is placed into a weighted bottle and the weight of the film is measured (the weight of swollen film is represented by Ws).

(7) The film in the bottle with the cap taken off is dried in a drier at 100° C. for 3 hours under a reduced pressure of 10 mmHg or less (the weight of the dried film is represented by Wd).

When the film is easy to break in xylene, the film may be immersed therein as enclosed with wire gauze or polyester netting or in a porous paper bag.

(8) The molecular weight between crosslinks (Mc) is calculated by the following equation (Flory-Rehner equation):

$$Mc = \psi_R \frac{V_S^0[(V_R/2) - V_R^{\frac{1}{3}}]}{\ln(1 - V_R) + V_R + XV_R^2}$$

wherein $V_R$ is the volume fraction of the resin in the swollen film and is given by the following equation;

$$V_R = \frac{1}{1 + \psi_R/\psi_S \cdot \frac{Ws - Wd}{Wd}}$$

wherein $\psi_R$ is the density of the film (g/cm$^3$), and $\psi_S$ is the density of xylene (0.8637 g/cm$^3$ at 25° C.);

$V_S^0$ is the molar volume of xylene (123 cc/mole); and

X is the interaction parameter of Flory-Huggins theory (assumed to be 0.4 herein) between the xylene and the resin in the film.

Preferably the second clear coating composition for use in the present invention comprises a hydroxyl group-containing acrylic resin or polyester resin as a base resin, an alkoxy monomeric melamine resin as a crosslinking agent and a low-molecular-weight polyol having a high hydroxyl value. Examples of preferred second clear coating compositions containing the acrylic resin or polyester resin and low-molecular-weight polyol are:

(1) a thermosetting resin composition (composition (1)) comprising;
  (A) a low-molecular-weight polyol having a weight-average molecular weight of about 400 to about 2,000 and a hydroxyl value of about 150 to about 400 mgKOH/g (component (A)),
  (B) an acrylic resin having a weight-average molecular weight of about 5,000 to about 50,000 and a hydroxyl value of about 50 to about 180 mgKOH/g (component (B)), and
  (C) an alkoxy monomeric melamine resin (component (C)), and
(2) a thermosetting resin composition (composition (2)) comprising;
  (A) a low-molecular-weight polyol having a weight-average molecular weight of about 400 to about 2,000 and a hydroxyl value of about 150 to about 400 mgKOH/g (component (A)),
  (B) a polyester resin having a weight-average molecular weight of about 2,000 to about 50,000, a hydroxyl value of about 50 to about 200 mgKOH/g and a cyclohexylene ring content of 7% by weight or more in the resin (component (B)), and
  (C) an alkoxy monomeric melamine resin (component (C)).

It is preferred that the low-molecular-weight polyol as the component (A) in the thermosetting coating composition (1) or (2) have a narrow molecular weight distribution to improve the scratch resistance, and that the ratio of weight-average molecular weight (Mw) to number-average molecular weight (Mn) of the component (A) be between about 1.0 and about 1.6.

The desired proportions of the components (A), (B) and (C) in the preferred clear coating composition (1) or (2) are about 15 to about 60% by weight of the component (A), about 15 to about 60% by weight of the component (B) and about 20 to about 50% by weight of the component (C) based on the total amount of the components (A), (B) and (C).

When the clear coating composition (1) or (2) which is a curable resin composition is heated for curing in the presence of a suitable acid catalyst at about 120 to about 160° C. for about 20 to about 40 minutes, the cured second clear coat shows the specified molecular weight between crosslinks and is outstanding in the scratch resistance and the finish appearance. Further, even if the coating method of the invention employs other clear coating composition than the coating composition (1) or (2), for example, a clear coating composition free of a low-molecular-weight polyol having a weight-average molecular weight of about 400 to about 2,000, or containing a polyisocyanate-type crosslinking agent to replace wholly or partially the alkoxy monomeric melamine resin, the formation of second clear coat outstanding in the scratch resistance and the finish appearance which is the object of the invention can be achieved by utilizing various contrivances to obtain the desired molecular weight between crosslinks, e.g. by using as a base resin an acrylic resin, polyester resin or urethane polyol resin having a satisfactorily high hydroxyl value, employing a sufficiently large amount of crosslinking agent or optimum amount of catalyst, or suitably adjusting the heating conditions for curing.

The acrylic resin for use in preparation of the above-exemplified preferable second clear coating composition (1) can be prepared by the same process as that for synthesis of usual acrylic resins for coating compositions, namely by carrying out a solution polymerization or a nonaqueous dispersion polymerization at about 50 to about 180° C. using a polymerization initiator such as a peroxide-type initiator or an azo-type initiator. Useful monomers are various and are not specifically limited insofar as they are radically polymerizable unsaturated monomers. Typical examples are as follows: (a) esters of acrylic or methacrylic acids: e.g. $C_{1-18}$ alkyl acrylate or methacrylate such as methyl acrylate, ethyl acrylate, propyl acrylate, isopropyl acrylate, butyl acrylate, hexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, octyl methacrylate, lauryl methacrylate, stearyl methacrylate and the like; glycidyl acrylate or methacrylate; $C_{2-8}$ alkenyl acrylate or methacrylate such as allyl acrylate or methacrylate and the like; $C_{2-8}$ hydroxyalkyl acrylate or methacrylate such as hydroxyethyl acrylate or methacrylate, hydroxypropyl acrylate or methacrylate and the like; and $C_{3-18}$ alkenyloxyalkyl acrylate or methacrylate such as allyloxyethyl acrylate or methacrylate and the like; (b) vinyl aromatic compounds such as styrene, α-methylstyrene, vinyltoluene, p-chlorostyrene, vinyl-pyridine and the like; (c) α,β-ethylenically unsaturated acids such as acrylic acid, methacrylic acid, itaconic acid and the like; (d) acrylic or methacrylic amides such as acrylamide, methacrylamide, n-butoxymethylacrylamide, n-methylolacrylamide, n-butoxymethylmethacrylamide, n-methylolmethacrylamide and the like; (e) others including acrylonitrile, methacrylonitrile, methyl isopropenyl ketone; vinyl acetate, Veoba monomer (trade name, product of Shell Chemical Co., Ltd., U.S.), vinyl propionate, vinyl pivalate, isocyanateethyl methacrylate, perfluorocyclohexyl acrylate, perfluorocyclohexyl methacrylate, p-styrenesulfoneamide, N-methyl-p-styrenesulfoneamide, γ-methacryloxypropyl trimethoxysilane and the like.

Acrylic resins usable in the invention are solution-type acrylic resins, nonaqueous dispersion-type acrylic resins, or a combination thereof.

The polyester resins useful for preparation of the second clear coating composition (2) exemplified above as a preferred one can be prepared by condensation reaction of a polybasic acid and a polyhydric alcohol as major components.

Examples of polybasic acids to be used for preparation of the polyester are phthalic acid, isophthalic acid, terephthalic acid, tetrahydrophthalic acid, tetrahydroterephthalic acid, hexahydrophthalic acid, hexahydroisophthalic acid, hexahydroterephthalic acid, het acid, trimellitic acid, hexahydrotrimellitic acid, pyromellitic acid, cyclohexanetetracarboxylic acid, methyltetrahydrophthalic acid, methylhexahydrophthalic acid, endomethylenehexahydrophthalic acid, methylendomethylenetetrahydrophthalic acid, maleic acid, fumaric acid, itaconic acid, succinic acid, glutaric acid, adipic acid, azelaic acid, sebacic acid, decanedicarboxylic acid, suberic acid, pimelic acid, dimer acid (tall oil fatty acid dimer), tetrachlorophthalic acid, naphthalenedicarboxylic acid, 4,4′-diphenylmethanedicarboxylic acid, 4,4′-dicarboxybiphenyl, anhydrides thereof, dialkylesters thereof, particularly dimethylesters thereof, etc.

Useful polyhydric alcohols include dihydric alcohols such as ethylene glycol, propylene glycol, 1,4-butanediol, 1,3-butanediol, 2,3-butanediol, 1,2-butanediol, 1,5-pentanediol, 1,4-pentanediol, 2,4-pentanediol, 2,3-dimethyltrimethylene glycol, 3-methylpentane-1,5-diol, 3-methyl-4,5-pentanediol, 2,2,4-trimethyl-1,3-pentanediol, 1,6-hexanediol, 1,5-hexanediol, 1,4-hexanediol, 2,5-hexanediol, 1,4-cyclohexanedimethanol, diethylene glycol, dipropylene glycol, triethylene glycol, neopentyl glycol, hydroxypivalate neopentyl glycol, polyalkylene oxide, bishydroxyethyl terephthalate, adduct of (hydrogenated) bisphenol A with alkylene oxide, etc. Useful glycols include monoepoxy compounds such as Cardula E10 (product of Shell Chemical Co., Ltd.), α-olefinepoxide, butylene oxide and the like.

Examples of polyhydric alcohols having 3 or more hydroxyl groups are glycerin, trimethylolpropane, trimethylolethane, diglycerin, pentaerythritol, dipentaerythritol, sorbitol, etc.

Also usable as such alcohols are compounds having both carboxyl group and hydroxyl group in the molecule. Exemplary of such compounds are dimethylol propionic acid, pivalic acid, 12-hydroxystearic acid, ricinolic acid and the like. Included among these compounds are lactones such as ε-caprolactone, γ-valerolactone and the like which are cyclic ester compounds.

Among the materials which can be added when required are natural or synthetic higher fatty acids, higher alcohols, benzoic acids, p-t-butylbenzoic acids and like monofunctional materials, natural oils and the like.

It is preferred that the amount of, among these materials, natural oils and fats having unsaturated bond in the molecule, maleic acid, fumaric acid, dimer acid, tetrahydrophthalic anhydride or the like be minimized in view of weatherability. A preferred polyester resin contains 7% or more by weight of cyclohexylene ring based on the resin. Our research reveals that the cyclohexylene ring content in this range serves to improve particularly the scratch resistance and the weatherability.

Examples of materials useful for introduction of cyclohexylene ring into the resin are hexahydrophthalic acid (anhydride), hexahydroisophthalic acid, hexahydroterephthalic acid, cyclohexanedimethanol, cyclohexene oxide, methylhexahydrophthalic acid (anhydride), etc. among which hexahydroterephthalic acid is useful to prepare a suitable resin.

The low-molecular-weight polyols useful as the component (A) in the preferable second clear coating compositions (1) and (2) include, for example, the compounds described below. A preferred molecular weight distribution of the low-molecular-weight polyol ranges from about 1.0 to about 1.6 in the Mw/Mn ratio in view of improvement of scratch resistance, but could be outside this range if the amounts of components in the coating composition and the heating conditions for curing are suitably adjusted.

(I) Branched chain low-molecular-weight polyester polyols prepared by condensation of organic acid component and alcohol component for use in preparation of usual polyester resin for coating compositions.

The materials useful for synthesis of the polyester (component (B)) in the preferred second clear coating composition (2) can be all used for synthesis of said polyester polyol.

Said low-molecular-weight polester polyol is of branched chain type. To provide a branched chain structure, the materials used need to include a polyhydric alcohol having 3 or more hydroxyl groups and/or polybasic acid having a basicity of 3 or more.

While the branched chain low-molecular-weight polyester polyol with a narrow molecular weight distribution can be prepared from said materials in some cases simply by a usual process for preparing a polyester, the following special contrivances are required in most cases in respect of the synthesis process, the selection of starting materials, purification of reaction product and the like. A suitable synthesis process is, for example, carried out by a prolonged period of reaction (e.g. about 15 to about 40 hours) in the presence of a proper catalyst such as p-toluenesulfonic acid or monobutyltin hydrooxide in an inert solvent of high boiling point (e.g. a solvent composed predominantly of alkylbenzene having a boiling point of about 130 to about 250° C.) in a large amount (e.g. about 30 to about 150 parts by weight of the solvent per 100 parts by weight of the polyester polyol resin) while refluxing the solvent in a solution. This process gives a polyester polyol having a narrow molecular weight distribution. The selection of starting materials may be adequately done, for example, by selecting the materials from which a polyester polyol can be synthesized by only an addition reaction which proceeds at a high reaction rate (e.g. Cardula E10 [Shell Chemical Co., Ltd.] and trimellitic acid; phthalic anhydride and trimethylolpropane; or like combinations). These materials are useful to produce a polyester polyol having a sharp molecular weight distribution. More specifically, a polyester polyol having a narrow molecular weight distribution can be obtained, for example, by addition reaction of 1 mole of trimellitic acid and 3 moles of a monoepoxy compound. The purification of reaction product can be achieved by various methods such as a fractional precipitation method (removal of high-molecular-weight components) in which a suitable bad solvent (e.g. petroleum ether) is added to a solution of low-molecular-weight polyester polyol, a reprecipitation method (removal of low-molecular-weight components) in which a solution of low-molecular-weight polyester polyol is added to a large amount of bad solvent to precipitate the resin, a method in which the reaction product is heated under reduced pressure to evaporate off the low-molecular-weight components for removal or a method in which separation is effected utilizing the phenomenon that the solubility of resin in a medium in a super critical state widely varies according to the pressure or temperature.

The low-molecular-weight polyol has preferably a weight-average-molecular weight of about 400 to about 2,000. To provide the molecular weight in this range, the polybasic acid is used in a molar ratio of between about 0.4 and about 0.75 relative to the polyhydric alcohol.

Suitable branched chain low-molecular-weight polyester polyols include, for example, those synthesized from cyclohexanedimethanol, trimethylolpropane, succinic anhydride and adipic acid in the presence of monobutyltin hydroxide as a catalyst in SWASOL 1500 (product of Cosmo Oil Company, aromatic petroleum solvent).

(II) Straight chain polyester polyols which are prepared from materials for use in preparation of usual polyester resin for coating compositions and which have a weight-average-molecular weight of about 400 to about 2,000 and a molecular weight distribution of between about 1.0 and about 1.6 in terms of Mw/Mn.

The materials for preparation of such polyester polyol can be any of other materials exemplified above in (I) than the polyhydric alcohols having 3 or more hydroxyl groups and polybasic acids having a basicity of 3 or more.

The straight chain polyester polyol with a narrow molecular weight distribution can be prepared more often by a usual process for preparing polyester polyols than the polyester polyols described above in (I). The special contrivances shown above in (I) are also available in respect of the synthesis process, selection of starting materials, purification of reaction product and the like.

Preferable straight chain polyester polyols include, for example, those prepared by synthesizing a polyester from hexahydrophthalic anhydride, adipic acid and neopentyl glycol by a usual process and subjecting the polyester to a high temperature for a prolonged period of time under reduced pressure (more specifically about 230° to about 240° C., about 5 to about 10 hours and reduced pressure of about 20 mmHg or less) to evaporate off the low-molecular-weight components.

(III) Ring-opened polyester polyols which are prepared by ring-opening polymerization of lactone using a polyhydric alcohol having two or more hydroxyl groups as a polymerization initiator and which have a weight-average molecular weight of about 400 to about 2,000 and a molecular weight distribution of between about 1.0 and about 1.6 in terms of Mw/Mn.

Examples of lactones which can be used are $\epsilon$-caprolactone, $\beta$-methyl-$\delta$-valerolactone, $\gamma$-valerolactone, $\delta$-caprolactone, $\gamma$-caprolactone, $\gamma$-methyl-valerolactone, $\beta$-propiolactone, $\gamma$-butyrolactone, etc. Representative polyhydric alcohols for use as the polymerization initiator are ethylene glycol, diethylene glycol, 1,4-butanediol, 1,6-hexanediol, 3-methyl-pentane-1,5-diol, glycerin, trimethylolethane, trimethylolpropane, pentaerythritol, etc. Catalysts useful in the ring-opening polymerization are, for example, boron trifluoride-ethyl ethelate, sulfuric acid, phosphoric acid, tetraisopropyl titanate, tetrabutyl titanate, dibutyltin oxide, hydroxytitanium stearate, isopropyl titanium stearate, litharge, etc.

While a ring-opened polyester polyol having a narrow molecular weight distribution can be prepared merely by a usual ring-opening polymerization method, the purification of reaction product may be carried out by proper utilization of the special contrivances as described above in (I).

Of the ring-opened polyester polyols, preferred ones include those produced by addition reaction of 1 mole of ethylene glycol with 5 moles of $\epsilon$-caprolactone, or 1 mole of trimethylolpropane with 6 of $\epsilon$-caprolactone.

(IV) Acryl polyols which are copolymers of hydroxyl-containing monomer and monomer copolymerizable therewith.

Examples of useful hydroxyl-containing monomers are usual hydroxyl-containing monomers such as hydroxyethyl acrylate, hydroxyethyl methacrylate, hydroxypropyl acrylate, hydroxypropyl methacrylate, etc. Exemplary of monomers copolymerizable with the hydroxyl-containing monomer are a wide range of monomers useful for synthesis of acrylic resins for coating compositions, such as esters of acrylic acids or methacrylic acids with $C_{1-18}$ monohydric alcohol, styrene, acrylonitrile, acrylamide, methacrylamide, N-methylol acrylamide butyl ether, etc.

The acryl polyol with a narrow molecular weight distribution can be obtained by forming a copolymer by radical copolymerization of said monomers and purifying the copolymer by heat treatment under reduced pressure, fractional precipitation or like methods.

Preferable of said acryl polyols are acryl polyols prepared, for example, by forming a copolymer by polymerization of 25 parts by weight of n-butyl methacrylate, 35 parts by weight of n-butyl acrylate and 40 parts by weight of 2-hydroxyethyl acrylate in the presence of mercaptan as a chain transfer agent and azobisisobutyronitrile as a polymerization initiator in a solution and purifying the copolymer by treatment under reduced pressure and fractional treatment.

The term "alkoxy monomeric melamine resin" used as the component (C) in the preferred second clear coating compositions (1) and (2) refers to a low-molecular-weight melamine which has, on the average per triazine nucleus, three or more methylol groups etherified with a monohydric alcohol of 1 to 5 carbon atoms such as methanol, n-butanol, isobutanol or the like and an average condensation degree of 2 or less, preferably about 1.1 to about 1.8 and which is a mixture containing 50% by weight or more of compound having one nucleus or a compound having one nucleus. Examples of commercially available melamines which can be used herein are methyl-etherified melamines available under trademarks CYMEL 303, CYMEL 325, CYMEL 327, CYMEL 350, CYMEL 370 (products of Mitsui Toatsu Chemicals Inc.), NIKALAC MS17, NIKALAC MS15 (products of Sanwa Chemical Co., Ltd.), REGIMIN 741 (Monsanto Chemical Co.), Sumimal M-55 (product of Sumitomo Chemical Co., Ltd.); methyl ether-butyl ether mixture-etherified melamines available under trademarks CYMEL 202, CYMEL 235, CYMEL 238, CYMEL 254, CYMEL 272, CYMEL 1130 (products of Mitsui Toatsu Chemicals Inc.), NIKALAC MX-485, NIKALAC MX-487 (products of Sanwa Chemical Co., Ltd.), REGIMIN 755 (product of Monsanto Chemical Co.), etc.

While the alkoxy monomeric melamine resin can be used as a preferred crosslinking agent of second clear coating composition of the invention, a polymeric melamine formaldehyde resin or polisocyanate compound can be alternatively used as a crosslinking agent by suitably determining the amounts of components in the coating composition, heating conditions for curing and the kind of hydroxyl-containing resin to be conjointly used.

Useful polyisocyanate compounds include, for example, organic diisocyanates such as hexamethylene diisocyanate, trimethylhexamethylene diisocyanate and like aliphatic diisocyanates; xylylene diisocyanate, isophorone diisocyanate and like cyclic aliphatic diisocyanates; tolylene diisocyanate, 4,4'-diphenylmethane diisocyanate and like aromatic diisocyanates; adducts of such organic diisocyanate with polyhydric alcohol, low-molecular-weight polyester resin or water; copolymers of these organic disocyanates; biuret compounds of isocyanate; etc. Representative commercial products thereof are "BARNOCK D-750, -800, DN-950, -970 or 15-455" (products of Dainippon Ink Chemical Ind., Co.), "DESMODULE L, N, HL or IL" (products of Bayer AG, West Germany), "TAKENATE D-102, -202, -110N or -123N" (products of Takeda Yakuhin Kogyo K.K.), "CORONATE L, HL, EH, or 203" (products of Nippon Polyurethane Kogyo K.K.), "DURANATE 24A-90CX" (Asahi Kasei Kogyo K.K.), etc.

Also usable are blocked polyisocyanate compounds with the isocyanate group blocked with a suitable blocking agent.

Blocked polyisocyanates are those prepared by treating a non-yellowing polyisocyanate such as isophorone diisocyanate, hexamethylene diisocyanate, lysine diisocyanate or dicyclohexylmethane-4,4'-diisocyanate with a usual blocking agent such as aliphatic or aromatic monohydric alcohol, oxime, lactam, phenol or the like. Examples of blocked polyisocyanates are TAKENATE B-815N (product of Takeda Yakuhin Kogyo K.K.), TAKENATE B-840N (product of Takeda Yakuhin Kogyo K.K.), Adduct B1065 (product of Veba Chemie Co., Ltd.), ADDITOL VXL-80 (product of Hoechst, Japan), etc.

The solvent contained in the second clear coating composition of the invention can be any of solvents which can stably dissolve or disperse the resin and low-molecular-weight polyol contained therein. Useful solvents can be suitably selected from aromatic solvents, saturated hydrocarbon-type solvents, ketone-type solvents, ester-type solvents, ether-type solvents, glycol ether-type solvents, alcohol-type solvents and the like.

When required, the second clear coating composition of the invention may contain conventional additives such as a leveling agent, thickener, ultraviolet-absorber, light stabilizer, curing catalyst, agent for improving the electrostatic coating efficiency and the like. Examples of curing catalysts which can be used when an amino resin is employed as a crosslinking agent are p-toluenesulfonic acid, phosphoric acid, alkylester of phosphoric acid, dinonylnaphthalenedisulfonic acid, dodecylbenzenesulfonic acid and the like, examples of dinonylnaphthalenedisulfonic acid and dodecylbenzenesulfonic acid being "BECKAMIN P-198" (product of Dainippon Ink Kagaku Kogyo K.K.), "NACURE 155, 2500X, X-49-110, 5225 or 3525" (product of King Corp., U.S.A.), etc. Also usable as curing catalysts are dinonylnaphthalenedisulfonic acid, dodecylbenzenesulfonic acid or the like blocked with organic amine. Examples of curing catalyst which can be used in employing a (blocked) polyisocyanate compound as a crosslinking agent are dibutyltin diacetate, dibutyltin dioctate, dibutyltin dilaurate, triethylamine, diethanolamine, etc.

The amount of the curing agent is 0 to about 10 parts by weight, preferably about 0.05 to about 5 parts by weight, per 100 parts by weight of the resin.

When the clear coating composition containing the curing catalyst is applied to the base coat by a wet-on-wet method, the clear coat tends to become less curable than when applied to the cured base coat because the curing catalyst in the clear coating composition is partially permeated into the non-cured base coat. Consequently the clear coating composition to be applied by a wet-on-wet method needs to contain a slightly excessive amount of curing catalyst which tends to result in yellowing of the coat on curing. Coating compositions giving highly scratch-resistant coats usually requires incorporation of a curing catalyst, and thus are likely to involve said problem when applied by a wet-on-wet method (i.e. 2C1B method). On the other hand, the coating method of the invention can completely obviate this problem because the clear coating composition giving scratch-resistant coats is used as a second clear coating composition and applied to the cured first clear coat so that the need is eliminated for incorporating an increased amount of curing catalyst in the second clear coating composition.

Usable as the thickener are silica fine powder, bentonite-type fluidity modifier, polyamide-type fluidity modifier, crosslinked particles prepared by aqueous emulsion polymerization, crosslinked particles prepared by nonaqueous polymerization and the like. Diurea-type fluidity-modifiers prepared from diisocyanate and primary monoamine are suitable for incorporation into the second clear coating composition in view of the finish appearance and distinctness-of-image gloss.

The first clear coating composition for use in the finish coating method of the invention can be any of suitable clear coating compositions used in conventional 2C1B coating methods, such as those disclosed in Japanese Unexamined Patent Publications Nos. 71540/1977, 126040/1978, 149063/1978, 73835/1979, etc. Representative clear coating compositions for use herein are those comprising an oil-free polyester or a hydroxyl-containing acrylic resin containing as a monomer component 0 to 30% by weight of styrene, and as a crosslinking agent, an amino resin or a polyisocyanate compound.

Among preferred properties of the first clear coat is its high adhesion to the second clear coat. For this purpose, it is desirable that the resin (mainly acrylic resin or polyester resin) of the first clear coating composition be adjusted to a hydroxyl value of about 100 to about 250 mgKOH/g, preferably about 120 to about 200 mgKOH/g.

Examples of pigment-containing thermosetting base coating compositions useful in the present invention includes, for example, coating compositions heretofore known as those for plastics or metal substrates and capable of forming films outstanding in finish appearance (distinctness-of-image gloss, surface smoothness, gloss, etc.), weatherability (gloss retentivity, color fastness, chalking resistance, etc.), chemical resistance, water resistance, humidity resistance, curability and the like. Specific examples are coating compositions containing, as main vehicle components, amino-acryl type resin, amino-alkyd type resin, amino-polyester type resin, polyisocyanate-acryl type resin or the like. These coating compositions are not specifically limited in the form and can be in any desired form such as organic solvent solution type, nonaqueous dispersion type, aqueous solution (dispersion) type, powder type, high solid type or like forms. Illustrative of pigment to be incorporated in the coating composition are aluminum powder, mica powder, organic coloring pigment, inorganic coloring pigment, titanium white, extender pigment and the like.

The coating method of the present invention is carried out as follows. The method of the invention is intended mainly to coat automotive bodies as substrates. Automotive bodies are usually covered with a finish coat over an electrodeposition coat formed on a chemical-conversion treated steel body panel or over an intercoat on the electrodeposition coat formed thereon.

According to the finish coating method of the present invention, the base coating composition is usually sprayed over the electrodeposition coat formed on chemical-conversion treated substrate or over the intercoat. Useful coaters are a usual air spray gun, air-spray electrostatic coater, rotary atomizing-type electrostatic coater, etc. A preferred thickness of the base coat is about 10 to about 30 μm (after curing). After application, the base coat is left to stand at room temperature for about 2 to about 10 minutes or is dried at about 50° to about 80° C. for about 1 to about 5 minutes and then the first clear coating composition is applied by a coater suitably selected from the coaters of the type used for application of base coat. A preferred thickness of the first clear coat is about 20 to about 50 μm (after curing). Then the coated substrate is heated for curing at about 60° to about 170° C. for about 10 to about 90 minutes. The heating conditions depend on the kind of materials for the base coating composition and the first clear coating composition. The use of a polyisocyanate-type crosslinking agent involves a relatively low curing temperature, whereas the use of a melamine resin as a crosslinking agent requires a relatively high curing temperature. The second clear coating composition is applied after curing the base coat and first clear coat. The coater used for this application is suitably selected from the coaters useful for application of first clear coating composition. A preferable thickness of cured second clear coat is about 10 to about 50 μm. When required, the surface of cured first clear coat may be slightly sanded with sandpaper No. 400 to No. 1000 to assure a desired adhesion between the first and second clear coats. The second clear coat is heated for curing preferably at about 60° to about 170° C. for about 10 to about 90 minutes. The heating conditions depend on the kind of crosslinking agent contained in the second clear coating composition and other factors as is the case with the first clear coating composition.

In accordance with the coating method of the invention, a finish coat can be formed which is outstanding in the scratch resistance and the finish appearance. The coating method of the invention is suitable for coating substrates requiring a high scratch resistance, such as automotive bodies, furniture, outside building materials and is particularly suitable for finish coating of automotive bodies. When using a clear coating composition containing a resin of low molecular weight and a high hydroxyl value and capable of forming a scratch-resistant coat, the wet-on-wet method causes the coating composition to infiltrate into the base coat at the interface therebetween, thereby making it difficult to provide a good coating film appearance. On the other hand, the coating method of the invention can obviate this problem because a highly scratch-resistant clear coat (second clear coat) is formed on the cured clear coat (first clear coat) by the coating method of the invention. Another advantage is that the second clear coating composition is unlikely to yellow during curing because a smaller amount of curing catalyst such as an acid catalyst, metallic catalyst or the like is present in the second clear coating composition than in the first clear coating composition (in 2C1B method). Further the two applications of clear coating compositions can achieve a remarkable improvement of finish appearance. With these advantages according to the invention, there is provided an ideal finish coating method which can produce a finish coat having an excellent finish appearance and a high scratch resistance.

The finish coating method of the invention can fully produce the contemplated results particularly when used for application of deep color finish over automotive bodies on which scratches are particularly prominent.

This invention will be described below in greater detail with reference to the following Preparation Examples, Examples and Comparison Examples in which the parts and the percentages are all by weight unless otherwise specified.

PREPARATION EXAMPLE 1

Preparation of base coating composition (a)

A solution of acrylic resin having a resin content of 50% and a varnish viscosity of $Z_1$ (as determined by a Gardner-Holdt bubble viscometer, 25° C., the same hereinafter) was prepared by copolymerizing 15 parts of styrene, 20 parts of methyl methacrylate, 30 parts of ethyl acrylate, 21 parts of n-butyl methacrylate, 12 parts of 2-hydroxyethyl methacrylate and 2 parts of acrylic acid in the presence of $\alpha,\alpha'$-azobisisobutyro-nitrile as a polymerization initiator in xylene. A solution-type base coating composition was prepared from the acrylic resin solution thus obtained and the other components in the following amounts:

| 50% acrylic resin solution | 160 parts |
|---|---|
| 60% UBAN 20SE (*1) | 33 parts |
| Aluminum paste A (*2) | 1 part |
| Aluminum paste B (*3) | 1 part |
| Carbon black (*4) | 1.0 part |

Note:
(*1) product of Mitsui Toatsu Chemicals, Inc., melamine resin
(*2) product of Toyo Aluminum K.K., Alumipaste No. 4919
(*3) product of Ecalt Co., Ltd., Stapa Mobil 801
(*4) product of Columbia Carbon Co., Ltd., Neo Specta Beads AG The thus obtained base coating composition (a) was adjusted to a viscosity of 14 seconds (Ford cup No. 4/20° C.) with a solvent mixture of 40 parts of toluene, 30 parts of SWASOL-1000 (product of Cosmo Oil Company), 20 parts of butyl acetate and 10 parts of n-butanol, and was used for coating tests.

PREPARATION EXAMPLE 2

Preparation of base coating composition (b)

An acrylic resin solution (b−1) having a resin content of 70% and a varnish viscosity of $Z_3$ was prepared by copolymerizing 15 parts of styrene, 15 parts of methyl methacrylate, 49 parts of ethyl acrylate, 20 parts of hydroxyethyl acrylate and 1 part of acylic acid in the presence of $\alpha,\alpha'$-azobisisobutyronitrile as a polymerization initiator in xylene.

An acrylic resin dispersion (b−2) with a resin content of 50% was prepared by dispersion polymerization of 70 parts of vinyl monomers (a mixture of 30% of styrene, 30% of methyl methacrylate, 23% of 2-ethylhexyl acrylate, 15% of 2-hydroxyethyl acrylate and 2% of acrylic acid) in the presence of 30 parts of a copolymer as a dispersion stabilizer prepared from 30 parts of an adduct of poly-12-hydroxystearic acid with glycidyl methacrylate, 10 parts of styrene, 20 parts of methyl methacrylate, 17 parts of 2-ethylhexyl methacrylate, 20 parts of 2-hydroxyethyl methacrylate and 3 parts of acrylic acid in n-heptane by usual method.

A base coating composition (b) was prepared from the resin solution (b−1), resin dispersion (b−2) and the other components in the following amounts:

| Acrylic resin solution (b-1) | 29 parts |
|---|---|
| Acrylic resin nonaqueous dispersion (b-2) | 120 parts |
| 88% CYMEL 370 (*5) | 23 parts |
| Aluminum paste A (*2) | 1 part |
| Aluminum paste C (*6) | 2 part |

| | |
|---|---|
| Carbon black (*4) | 1.0 part |

Note:
(*5) product of Mitsui Toatsu Chemicals, Inc., melamine resin
(*6) product of Toyo Aluminum K.K., No. 55-519

The base coating composition (b) was adjusted to a viscosity of 15 seconds (Ford cup No. 4/20° C.) with a solvent mixture of 30 parts of n-heptane, 30 parts of xylene, 30 parts of SWASOL-1000 and 10 parts of butyl cellosolve and was used for coating tests.

PREPARATION EXAMPLE 3

Preparation of first clear coating composition (c)

Preparation of acrylic resin solution (c−1)

An acrylic resin solution (c−1) was prepared with use of a usual device for production of an acrylic resin equipped with a reflux condenser, a stirrer and a thermometer.

Into a reactor were placed 50 parts of SWASOL-1000 (product of Cosmo Oil Company, aromatic organic solvent) and 15 parts of n-butanol. The mixture was heated to 130° C. and a mixture of the following monomers and a polymerization initiator was added dropwise over a period of 3 hours.

| | |
|---|---|
| Styrene | 15 parts |
| Butyl methacrylate | 30 parts |
| 2-Ethylhexyl methacrylate | 23 parts |
| 2-Hydroxypropyl acrylate | 15 parts |
| 2-Hydroxyethyl methacrylate | 15 parts |
| Acrylic acid | 2 parts |
| α,α'-Azobisisobutyronitrile | 2.0 parts |

Thirty minutes after the addition of the monomer mixture, a mixture of 1.0 part of 2,2'-azobis(2,4-dimethylvaleronitrile) and 10 parts of xylene was added dropwise over a period of 1 hour. The reaction proceeded at 130° C. Thereafter the reaction mixture was stirred for 30 minutes in the flask maintained at 130° C. and then was cooled. SWASOL-1000 (24 parts) was added, giving an acrylic resin solution (c−1) having a solids concentration of 50%. The resin had a hydroxyl value of 129.

A first clear coating composition (c) with the following composition was prepared using the acrylic resin solution (c−1):

| | |
|---|---|
| 50% Acrylic resin solution (c-1) | 140 parts |
| 60% UBAN 20SE (*1) | 50 parts |

The first clear coating composition (c) was adjusted to a viscosity of 25 seconds (Ford cup No. 4/20° C.) with a solvent mixture of 90 parts of SWASOL-1000 and 10 parts of n-butanol and was used for coating tests.

PREPARATION EXAMPLE 4

Preparation of first clear coating composition (d)

(i) Preparation of acrylic resin solution (d−1)

Cellosolve acetate (40 parts) was placed into a usual acrylic resin reactor equipped with a stirrer, a thermometer and a reflux condenser and was heated with stirring to 135° C. at which a mixture of the following monomers was added over a period of 3 hours:

| | |
|---|---|
| Styrene | 10 parts |
| Isobutyl methacrylate | 32 parts |
| 2-Ethylhexyl methacrylate | 20 parts |
| 2-Hydroxyethyl methacrylate | 35 parts |
| Methacrylic acid | 3 parts |
| Cellosolve acetate | 50 parts |
| α,α'-Azobisisobutyronitrile | 4 parts |

The reaction was continued at 135° C. for 1 hour after the addition of the monomer mixture, and a mixture of 10 parts of cellosolve acetate and 0.6 part of α,α'-azobisisobutyronitrile was added over a period of 1.5 hours. The reaction was continued for 2 hours thereafter and the cellosolve acetate was distilled off under reduced pressure to achieve a 65% resin concentration, giving an acrylic resin solution (d−1).

(ii) Preparation of nonaqueous dispersion-type thermosetting resin (d−2)

Into a reactor were placed 126 parts of melamine, 412 parts of butyformaldehyde (40%), 190 parts of n-butanol and 36 parts of xylene. The mixture was heated and the reaction proceeded for 7 hours while separating the distilling water by a water separator. The system was subjected to a reduced pressure to remove 100 parts of the distillate, and 50 parts of a hydrocarbon solvent (SHELLSOL 140, trademark, product of Shell Oil Co., Ltd.) and 50 parts of n-heptane were added to obtain a melamine resin solution (A) having a resin content of 60% and a varnish viscosity of J.

A reactor was charged with 58 parts of the melamine resin solution (A), 30 parts of n-heptane and 0.15 part of benzoyl peroxide and the mixture was heated to 95° C. A mixture of the following monomers was added dropwise over a period of 3 hours:

| | |
|---|---|
| Styrene | 11 parts |
| Acrylonitrile | 9 parts |
| Methyl methacrylate | 13 parts |
| Methyl acrylate | 15 parts |
| n-Butyl methacrylate | 18 parts |
| 2-Hydroxyethyl acrylate | 14 parts |
| Acrylic acid | 1.2 parts |
| Benzoyl peroxide | 0.5 part |
| n-Butanol | 5 parts |
| SHELLSOL 140 | 30 parts |
| n-Heptane | 9 parts |

A mixture of 0.65 part of t-butyl peroctoate and 3.5 parts of SHELLSOL 140 was added dropwise over a 1-hour period 1 hour after the addition of the monomer mixture. The mixture was stirred for 2 hours while it was maintained at 95° C. The pressure was reduced and the solvent (34 parts) was removed, giving a nonaqueous thermosetting resin dispersion (d−2) having a 60% resin content and a varnish viscosity of A.

A first clear coating composition (d) was prepared from the acrylic resin solution (d−1), the nonaqueous dispersion (d−2) and the other component in the following amounts:

| | |
|---|---|
| 50% Acrylic resin solution (d-1) | 140 parts |
| 70% UBAN 20HS (*7) | 43 parts |
| 60% Nonaqueous thermosetting resin dispersion (d-2) | 54 parts |

Note:
(*7) product of Mitsui Toatsu Chemicals Inc., melamine resin

The clear coating composition (d) was adjusted to a viscosity of 30 seconds (Ford cup No. 4/20° C.) with a solvent mixture of 35 parts of Naphthesol No. 150, 35 parts of butyl cellosolve and 30 parts of n-butanol and used for coating tests.

PREPARATION EXAMPLE 5

Preparation of second clear coating composition (A)

(i) Preparation of acrylic resin solution (A—1)

SWASOL-1000 (product of Cosmo Oil Company, aromatic solvent, 50 parts) and 15 parts of n-butanol were placed into a usual acrylic resin reactor equipped with a stirrer, a thermometer and a reflux condenser and was heated with stirring to 132° C. at which a mixture of the following monomers was added over a period of 3 hours:

| | |
|---|---|
| Styrene | 20 parts |
| Isobutyl methacrylate | 24 parts |
| n-Butyl methacrylate | 35 parts |
| 2-Hydroxyethyl methacrylate | 19 parts |
| Acrylic acid | 2 parts |
| α,α'-Azobisisobutyronitrile | 2 parts |

After the monomer mixture was maintained at 132° C. for 1 hour after the addition of the mixture, a mixture of 1 part of t-butyl peroctoate and 10 parts of SWASOL-1000 was added over a period of 1 hour. The mixture was stirred for 2 hours while being maintained at 132° C. and was cooled. Thereto added was SWASOL-1000, giving an acrylic resin solution (A—1) having a solids concentration of 50%. The acrylic resin had a weight-average molecular weight (Mw) of 19,000 and a hydroxyl value of 82.

(ii) Preparation of low-molecular-weight polyol (A—2)

A flask was charged with 53.8 parts of cyclohexane dimethanol, 12.8 parts of trimethylolpropane, 44.3 parts of adipic acid, 40 parts of an aromatic petroleum solvent (SWASOL-1500, product of Cosmo Oil Company) of 180° to 220° C. in boiling point and 0.5 part of monobutyltin hydrooxide. The reaction was conducted while the condensed water was removed by a water separator with the solvent being reluxed. The reaction was terminated when the acid value reached 7, and the reaction mixture was concentrated under reduced pressure.

The obtained solution had a solids concentration of 80.0%, a hydroxyl value of solids of 247, a weight-average molecular weight (Mw) of 1170 and a weight-average molecular weight/number-average molecular weight ratio (Mw/Mn ratio) of 1.3.

(iii) Preparation of clear coating composition (A)

A clear coating composition (A) was prepared from the acrylic resin solution (A—1), low-molecular-weight polyol (A—2) and the other components in the following amounts:

| | |
|---|---|
| Acrylic resin solution (A-1) (solids 50%) | 80 parts |
| Low-molecular-weight polyol (A-2) (solids 100%) | 30 parts |
| CYMEL-235 (solids 100%,) (*8) | 30 parts |
| Dodecylbenzenesulfonic acid | 2 parts |

(Note:
(*8) product of Mitsui Toatsu Chemicals Inc., methyl-butyl mixture-etherified monomeric melamine resin)

The clear coating composition was adjusted to a viscosity of about 30 seconds (Ford cup No. 4/20° C.) with a xylene/cellosolve acetate/n-butanol mixture solvent (40/50/10) and used for coating tests.

PREPARATION EXAMPLE 6

Preparation of second clear coating composition (B)

(i) Preparation of nonaqueous dispersion (B—1)

Butyl alcohol (70 parts) was refluxed with heating and the following mixture of monomers and a polymerization initiator was added dropwise over a period of 3 hours. Thirty minutes after the addition, a mixture of 1 part of t-butyl peroctoate and 30 parts of n-butanol was added dropwise over a period of 1 hour and the mixture was aged for 5 hours.

| | |
|---|---|
| Styrene | 15 parts |
| 2-Ethylhexyl methacrylate | 40 parts |
| n-Butyl methacrylate | 19 parts |
| 2-Hydroxy methacrylate | 23 parts |
| Methacrylic acid | 3 parts |
| α,α'-Azobisisobutyronitrile | 2 parts |

The obtained acrylic resin solution had a solids content of 50%.

To 203 parts of the varnish thus obtained were added 1 part of glycidyl methacrylate, 0.02 part of 4-t-butypyrocatechol and 0.1 part of dimethyl aminoethanol. The mixture was reacted at a reflux temperature for 5 hours to introduce copolymerizable double bond. A flask was charged with a 50-part portion of the reaction product and 100 parts of ethylcyclohexane to which the following monomers and polymerization initiator were added dropwise at a reflux temperature over a period of 4 hours. Thereto added was 0.2 part of t-butyl peroctoate and the mixture was aged for 3 hours to obtain a nonaqueous dispersion (B—1).

| | |
|---|---|
| Styrene | 13 parts |
| Methyl methacrylate | 45 parts |
| n-Butyl methacrylate | 10 parts |
| Acrylonitrile | 20 parts |
| Glycidyl methacrylate | 10 parts |
| Methacrylic acid | 2 parts |
| α,α'-Azobisisobutyronitrile | 1 part |

The obtained dispersion was a milky-white one (solids content 50%).

(ii) Preparation of low-molecular-weight polyol (B—2)

A flask was charged with 25.0 parts of trimethylolpropane, 25.0 parts of ε-caprolactone and 0.1 part of tetrabutyl titanate. The mixture was heated to 100° C. and maintained at this temperature for 1 hour. Then the mixture was further heated to 120° C. and 50.0 parts of ε-caprolactone was added dropwise over a period of 1 hour. The resulting mixture was further heated to 180° C. and the reaction was continued until the reaction product showed no change in the refractive index. Then the system was subjected to reduced pressure and small amounts of unreacted substances and low-molecular-weight substances were removed. Then the residue was cooled. The obtained product had a solids concentration of 100%, a hydroxyl value of 302, Mw of 1010, and Mw/Mn of 1.31.

(iii) Preparation of clear coating composition (B)

A clear coating composition (B) was prepared from the acrylic resin solution (A−1), nonaqueous dispersion (B−1), low-molecular-weight polyol (B−2) and the other components in the following amounts:

| Acrylic resin solution (A-1) (solids 50%) | 30 parts |
|---|---|
| Nonaqueous dispersion (B-1) (solids 50%) | 50 parts |
| Low-molecular-weight polyol (B-2) (solids 100%) | 30 parts |
| CYMEL-235 | 30 parts |
| Dodecylbenzenesulfonic acid | 2 parts |

The thus obtained clear coating composition was adjusted to the same viscosity with the same solvent as the clear coating composition (A) and used for coating tests.

PREPARATION EXAMPLE 7

Preparation of second clear coating composition (C)

(i) Preparation of polyester resin solution (C−1)

A flask was charged with 42.0 parts of hexahydroterephthalic acid, 22.1 parts of isophthalic acid, 12.1 parts of trimethylolpropane and 37.3 parts of neopentyl glycol. The mixture was heated and the resulting condensed water was removed from the system through a distillation column while heating the system at a temperature elevated from 160° C. to 230° C. over a period of 3 hours. A small amount of xylene was added to the system maintained at 230° C. for 2 hours. A reaction was conducted by a solvent condensation method at 230° C. with the xylene being refluxed. The reaction mixture was cooled when the acid value reached 6. The mixture was diluted with a solvent mixture (xylene/SWASOL-1000=50/50) to a solids concentration of 60%, giving a polyester resin solution (C−1). The resin (solids) thus obtained had a hydroxyl value of 125 and Mw of 4010 and a cyclohexylene ring concentration of 20.2%.

(ii) Preparation of clear coating composition (C)

A clear coating composition (C) was prepared from the polyester resin solution (C−1), low-molecular-weight polyol (A−2) and the other components in the following amounts:

| Polyester resin solution (C-1) (solids 60%) | 67 parts |
|---|---|
| Low-molecular-weight polyol (A-2) (solids 100%) | 30 parts |
| CYMEL-235 | 30 parts |
| Dodecylbenzenesulfonic acid | 2 parts |

The obtained clear coating composition was adjusted to the same viscosity with the same solvent mixture as the clear coating composition (A) and used for coating tests.

PREPARATION EXAMPLE 8

Preparation of second clear coating composition (D)

(i) Preparation of acrylic resin solution (D−1)

Cellosolve acetate (65 parts) was placed into a usual acrylic resin reactor equipped with a stirrer, a thermometer and a reflux condenser and was heated with stirring to 132° C. at which the following monomer mixture was added over a period of 3 hours:

| Methyl methacrylate | 20 parts |
|---|---|
| n-Butyl methacrylate | 15 parts |
| n-Butyl acrylate | 18 parts |
| Hydroxyethyl acrylate | 25 parts |
| Placcel FM-3 (*9) | 20 parts |
| Acrylic acid | 2 parts |
| α, α'-Azobisisobutyronitrile | 1.9 parts |

Note:
(*9) Monomer manufactured by Dicel Chemical Ind. Ltd., adduct of 3 moles of ε-caprolactone with 1 mole of 2-hydroxyethyl methacrylate After the addition of the monomer mixture, the resulting mixture was maintained at 132° C. for a further one hour. A mixture of 1 part of t-butyl peroctoate and 10 parts of xylene was added over a period of 1 hour. The mixture was stirred while being maintained at 132° C. for 2 hours after which the mixture was cooled. Xylene was added thereto, giving an acrylic resin solution (D−1) having a solids concentration of 50%. The acrylic resin had a weight-average molecular weight of 21,500 and a hydroxyl value of 145.

(ii) Preparation of clear coating composition (D)

A clear coating composition (D) was prepared from the acrylic resin solution (D−1) and the other components in the following amounts:

| Acrylic resin solution (D-1) (solids 50%) | 120 parts |
|---|---|
| CYMEL-235 | 40 parts |
| Dodecylbenzenesulfonic acid | 2 parts |

The clear coating composition (D) was adjusted to the same viscosity with the same solvent mixture as the clear coating composition (A) and used for coating tests.

PREPARATION EXAMPLE 9

Preparation of second clear coating composition (E)

A second clear coating composition (E) was prepared from the acrylic resin solution (D−1), low-molecular-weight polyol (B−2) and the other component in the following amounts:

| Acrylic resin solution (D-1) (solids 50%) | 120 parts |
|---|---|
| Low-molecular-weight polyol (B-2) (solids 100%) | 40 parts |
| Dibutyltin diacetate | 0.05 part |

The mixture was diluted with a solvent mixture (cellosolve acetate/xylene, 50/50) to a viscosity of 25 seconds (Ford cup No. 4/20° C.) which was designated "A liquid". SUMIDULE N (polyisocyanate compound with NCO 16.5% solids concentration 75% manufactured by Sumitomo Bayer Urethane Co., Ltd.) was diluted with ethyl acetate to a solids concentration of 70% and designated "B liquid". The A liquid and B liquid were mixed at a ratio by weight of 70/30 and the mixture was designated a clear coating composition E.

PREPARATION EXAMPLE 10

Preparation of second clear coating composition (F) (for comparison example)

A second clear coating composition (F) was prepared from the acrylic resin solution (A−1), low-molecularweight polyol (A—2) and the other components in the following amounts:

| Acrylic resin solution (A-1) (solids 50%) | 110 parts |
|---|---|
| Low-molecular-weight polyol (A-2) (solids 100%) | 30 parts |
| CYMEL-235 | 15 parts |
| Dodecylbenzenesulfonic acid | 2 parts |

The thus obtained clear coating composition was adjusted to the same viscosity with the same solvent mixture as the clear coating composition (A) and used for coating tests.

PREPARATION EXAMPLE 11

Preparation of second clear coating composition (G) (for comparison example)

A clear coating composition (G) was prepared from the acrylic resin solution (A—1) and the other components in the following amounts:

| Acrylic resin solution (A-1) (solids 50%) | 140 parts |
|---|---|
| CYMEL-235 | 30 parts |
| Dodecylbenzenesulfonic acid | 2 parts |

The thus obtained clear coating composition was adjusted to the same viscosity with the same solvent mixture as the clear coating composition (A) and used for coating tests.

PREPARATION EXAMPLE 12

Preparation of second clear coating composition (H) (for comparison example)

A second clear coating composition (H) was prepared from the acrylic resin solution (A—1) and UBAN 20SE in the following amounts:

| Acrylic resin solution (A-1) (solids 50%) | 140 parts |
|---|---|
| UBAN 20SE (*1) | 50 parts |

The thus obtained clear coating composition was adjusted to the same viscosity with the same solvent mixture as the clear coating composition (A) and used for coating tests.

PREPARATION EXAMPLE 13

Preparation of clear coating composition (I)

A clear coating composition (I) was prepared in the same manner as the second clear coating composition (A) with the exception of using dodecylbenzensulfonic acid in an amount varied from 2 parts to 4 parts.

EXAMPLE 1 TO 5 AND COMPARISON EXAMPLE 1 TO 6

Using the coating compositions obtained above, coating tests were carried out by the following methods.

An epoxy-type cationic electrodeposition coating composition was electrodeposited on a zinc phosphate-conversion treated dull steel plate having a 0.8 mm thickness to give a primer of about 20 μm thickness when dried. The coated plate was baked at 170° C. for 20 minutes, sanded with a No. 400 sandpaper, degreased by wiping with petroleum benzine and coated by air-spray with an intermediate coating surfacer for automobiles to give a an intercoat of about 25 μm thickness when dried. The coated plate was baked at 140° C. for 30 minutes, wet-sanded with a No. 400 sandpaper, dried, and degreased with petroleum benzine. In this way, a test substrate was produced.

The base coating composition (a) or (b) was sprayed over the test substrate by an air spray gun F5 (product of Meiji Machinery Mfg., Co., Ltd.) to give a base coat of about 15 μm thickness when cured. The coated substrate was left to stand at room temperature for about 5 minutes. The first clear coating composition (c) or (d) was sprayed over the coated substrate by the air spray gun F5 to provide a clear coat of about 30 μm thickness when cured. The coated substrate was allowed to stand for setting at room temperature for about 10 minutes and was heated by an electric hot air drier at 140° C. for 30 minutes for curing. The second clear coating composition was sprayed over the coated substrate by the air spray gun F5 to give a second clear coat of about 30 μm thickness when cured and allowed to stand at room temperature for setting for about 10 minutes. The coating surface formed from the first clear coating composition prepared in Example 5 was slightly sanded with a No. 1000 sandpaper before application of the second clear coating composition. The coated substrate was heated by an electric hot air drier at 140° C. for 30 minutes or at 90° C. for 60 minutes for curing.

Table 1 shows the coating compositions obtained in Examples 1 to 5 and Comparison Examples 1 to 6 and used in the tests.

TABLE 1

|  | Example |  |  |  |  | Comparison Example |  |  |  |  |  |
|---|---|---|---|---|---|---|---|---|---|---|---|
|  | 1 | 2 | 3 | 4 | 5 | 1 | 2 | 3 | 4 | 5 | 6 |
| Coated plate No. | 1 | 2 | 3 | 4 | 5 | 6 | 7 | 8 | 9 | 10 | 11 |
| Base coating composition | a | a | b | b | a | a | a | a | a | a | a |
| First clear coating composition | c | c | c | d | d | c | c | c | c | A | I |
| Second clear coating composition | A | B | C | D | E | F | G | H | None | None | None |
| Heating conditions for curing second clear coating composition | (1*) | (1*) | (1*) | (1*) | (2*) | (1*) | (1*) | (1*) | — | — | — |
| Sanding of first clear coating composition | None | None | None | None | (*3) | None | None | None | — | — | — |

(Note)
(1*) = 140° C., 30 minutes
(2*) = 90° C., 60 minutes
(3*) = Sanding
Note:
(1) The coated plate No. 9 is one produced by 2C1B method using the first clear coating composition (c) as a top coating composition.
(2) The coated plates Nos. 10 and 11 are those produced by 2C1B method using the second clear coating compositions (A) and (I), respectively as top coating compositions.
(3) The coated plates Nos. 9 to 11 are those produced by heating the coats for curing at 140° C. for 30 minutes after application of clear coating composition.

The coating films listed in Table 1 were tested by the following methods.

Coating film appearance

The coating film appearance was evaluated in terms of sense of gloss, sense of solidness and yellowing according to the following ratings:
A: Excellent
B: Good
C: Fair
D: Poor
E: Very poor

Gloss value

The gloss value was determined at a specular reflectance of 60°.

Distinctness-of-image gloss

The distinctness-of-image gloss was determined using a model JCRI-GGD-166 device of Gd system for measuring the distinctness-of-image gloss (product of Japan Color Research Institute) set at the measurement angle of 55°.

Pencil hardness

Measured according to JIS K 5400

Impact resistance

The test was conducted with a du Pont impact tester with a falling weight-receiver having a 1-in. diameter and a 500 g-falling weight. The impact resistance was expressed in terms of the maximum height causing no cracking in the coating film (5-cm intervals).

Acid resistance

A 0.5 cc portion of 10% sulfuric acid was spotted on the coating surface. After 48 hours of standing at 20° C. and 75% RH for 48 hours, the coating surface was washed with water and observed. The film showing no fault was rated as A.

Weatherability

The coating film was irradiated with light beams of a lamp for 1600 hours using a sunshine weather-O-meter, and observed with the results rated as shown below.
A: No fault
B: Slight cracking
C: Marked cracking

Scratch resistance

An automobile with a coated test substrate adhered to the roof thereof was washed 15 times by a car washer (product of Yasui Sangyo K.K., model "PO 20 FWRC") and the state of coating surface of test substrate was observed and evaluated according to the following ratings:
A: The coating surface was found free of scratch by visual inspection.
B: The coating surface was found scratched negligibly slightly.
C: The coating surface was found scratched by visual inspection.
D: The coating surface was found distinctly and pronouncedly scratched by visual inspection.

Molecular weight between crosslinks

Measured by the xylene-swelling method as detailed hereinbefore.

Adhesion between first and second clear coats

The coating surface was cut crosswise with a cutter knife to the surface of intercoat. A cellophane tape (product of Nichiban K.K.) was adhered to the cut surface, and peel test was performed. The coating surface involving no peeling was rated as A and the coating surface involving peeling as B. Table 2 below shows the results.

TABLE 2

|  | Example | | | | | Comparison Example | | | | | |
|---|---|---|---|---|---|---|---|---|---|---|---|
|  | 1 | 2 | 3 | 4 | 5 | 1 | 2 | 3 | 4 | 5 | 6 |
| Coating film appearance | A | A | A | A | A | A | A | A | C | D | D (*4) |
| Gloss value | 99 | 99 | 99 | 99 | 99 | 99 | 99 | 99 | 96 | 92 | 91 |
| Distinctness-of-image gloss | 1.0 | 1.0 | 1.0 | 1.0 | 1.0 | 1.0 | 1.0 | 1.0 | 0.7 | 0.4 | 0.4 |
| Pencil hardness | F | F | F | F | HB | F | F | F | F | B | F |
| Impact resistance | 30 | 30 | 30 | 30 | 30 | 30 | 30 | 30 | 30 | 40 | 30 |
| Acid resistance | A | A | A | A | A | A | A | A | A | A | A |
| Weatherability | A | A | A | A | A | A | A | A | A | A | A |
| Scratch resistance | A | A | A | A-B | B | C | C | D | D | D | A-B |
| Molecular weight between crosslinks of films of second clear coating composition | 85 | 90 | 88 | 110 | 180 | 250 | 280 | 405 | — | — | — |
| Adhesion between films of first and second clear coating compositions | A | A | A | A | A | A | A | A | — | — | — |

(Note)
(*4) = Yellowing

We claim:
1. A coating method comprising the steps of applying a thermosetting coating composition containing a pigment to a substrate to be coated, applying a first clear coating composition to the coat to form a first clear coat, baking the two coats at the same time for curing, applying to the cured coats a second clear coating composition capable of forming a second clear coat having, when cured, a molecular weight between crosslinks of about 200 or less as determined by a xylene-swelling method and baking the second clear coat for curing, wherein said second clear coating composition comprises the following components:
(A) a low-molecular-weight polyol having a weight-average molecular weight of about 400 to about 2,000 and a hydroxyl value of about 150 to about 400 mgKOH/g;
(B) a resin selected from the group consisting of an acrylic resin having a weight-average molecular weight of about 5,000 to about 50,000 and a hydroxyl value of about 50 to about 180 mgKOH/g and a polyester resin having a weight-average molecular weight of about 2,000 to about 50,000, a hydroxyl value of about 50 to about 200 mgKOH/g and a cyclohexylene ring content of at least 7% by weight; and (C) an alkoxy monomeric melamine resin, wherein the amount of component (A) is about 15 to about 60% by weight, the amount of component (B) is about 15 to about 60% by weight, and the amount of component (C) is about 20 to about 50% by weight, based on the total amount of components (A), (B) and (C).

2. A coating method according to claim 1 wherein the coat formed from the second clear coating composition has a molecular weight between crosslinks of about 180 to about 50 after curing.

3. A coating method according to claim 1 wherein the coated formed from the second clear coating composition has a molecular weight between crosslinks of about 110 to about 50 after curing.

4. A coating method according to claim 1 wherein the ratio of the weight-average molecular weight to number-average molecular weight of the low-molecular-weight polyol is between about 1.0 to about 1.6.

5. A coating method according to claim 1 wherein the resin contained in the first clear coating composition has a hydroxyl value of about 100 to about 250 mgKOH/g.

* * * * *